J. R. Hathaway.
Burial Case.
Nº 86,396.    Patented Feb. 2, 1869.
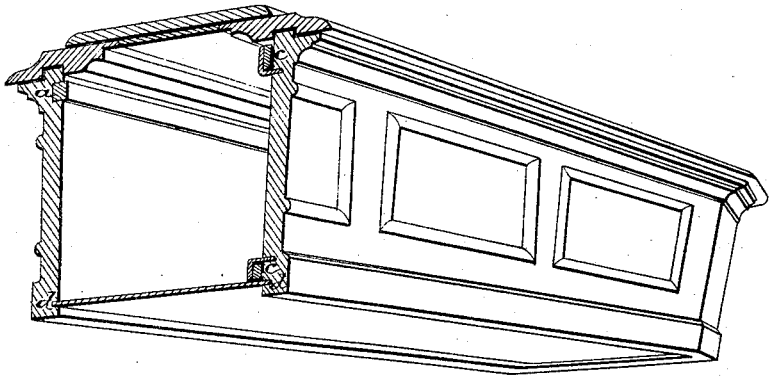
Witnesses.
W. C. Ashkettle.
Wm A. Morgan
Inventor.
J. R. Hathaway
per  Munn & Co.
    Attorneys.

UNITED STATES PATENT OFFICE.

JASPER R. HATHAWAY, OF WESTFIELD, NEW YORK.

Letters Patent No. 86,396, dated February 2, 1869.

IMPROVEMENT IN BURIAL-CASES.

The Schedule referred to in these Letters Patent and making part of the same.

*To all whom it may concern:*

Be it known that I, JASPER R. HATHAWAY, of Westfield, in the county of Chautauqua, and State of New York, have invented a new and useful Improvement in Burial-Cases; and I do hereby declare that the following is a full, clear, and exact description thereof, which will enable those skilled in the art to make and use the same, reference being had to the accompanying drawings, forming part of this specification.

This invention relates to the construction of burial-cases or coffins, and has more particular reference to improvements on a burial-case for which I have already received Letters Patent of the United States; and The improvement consists in making provision for fastening the trimming of the inside of the coffin, as will be hereinafter more fully described.

The drawing represents a sectional perspective view of a burial-case, constructed according to my invention.

The trimming of metallic burial-cases is fastened with glue or cement to the sides of the case, which, in depositing the body in the case, frequently becomes loosened, and consequently disarranged.

To obviate this difficulty, is the principal object which I have in view.

For this purpose, I provide (in making the castings) for securing wooden strips within the case, either by forming grooves, as seen at *a*, or by setting wires in the mould, and casting them in the side, where they can be bent, so as to secure the wooden strip, as seen at *c*.

These wooden strips may be secured to the sides, or around the case, near the top and near the bottom, as seen in the drawing.

But, around the bottom, they may be mitred around the case, and rest securely on the bottom, instead of being secured by either grooves or wires.

Grooves are formed in the sides and ends for the bottom, which bottom may be made of either cast or wrought-iron.

The sides and ends, as well as the top of this burial-case, are cast in pieces or sections, and the sides and ends are secured together, when the case is put up, by dovetail joints, or by rivets, or in any other suitable manner.

The bottom is secured in the groove, as seen at *d*, in the drawing.

By constructing these cases in sections, they may be packed before being put together, and shipped in a very compact form, thus saving much bulk, and the consequent marring and injury incident to transporting ready-made and finished burial-cases, or coffins.

I claim as new, and desire to secure by Letters Patent—

The metallic burial-case, formed of plates cast with recesses, *a*, or hooks, *c*, to receive the wooden strips, by which the inner trimmings are firmly secured in place, the sides of said case being also cast with grooves, *d*, for the reception of the wrought-iron bottom, all arranged as described, for the purpose specified.

JASPER R. HATHAWAY.

Witnesses:
WM. F. MCNAMARA,
ALEX. F. ROBERTS.